(12) United States Patent
Oleson

(10) Patent No.: US 8,152,453 B2
(45) Date of Patent: Apr. 10, 2012

(54) CEILING FAN WITH ANGLED MOUNTING

(75) Inventor: Richard A. Oleson, Lexington, KY (US)

(73) Assignee: Delta T Corporation, Lexington, KY (US)

( * ) Notice: Subject to any disclaimer, the term of this patent is extended or adjusted under 35 U.S.C. 154(b) by 888 days.

(21) Appl. No.: 12/203,960

(22) Filed: Sep. 4, 2008

(65) Prior Publication Data

US 2009/0072108 A1 Mar. 19, 2009

Related U.S. Application Data

(60) Provisional application No. 60/972,890, filed on Sep. 17, 2007.

(51) Int. Cl.
*F01D 25/24* (2006.01)
*F03D 11/02* (2006.01)
*F04D 29/40* (2006.01)

(52) U.S. Cl. ............ 415/126; 416/246; 415/1

(58) Field of Classification Search ......... 415/126, 415/1; 416/244 R, 246
See application file for complete search history.

(56) References Cited

U.S. PATENT DOCUMENTS

| | | | |
|---|---|---|---|
| 6,682,308 B1 * | 1/2004 | Fei et al. | 416/246 |
| 7,252,478 B2 | 8/2007 | Aynsley | |
| 7,284,960 B2 | 10/2007 | Aynsley | |
| 7,510,160 B1 * | 3/2009 | Wang | 248/343 |
| 7,726,945 B2 * | 6/2010 | Grant et al. | 416/134 R |
| 7,997,869 B2 * | 8/2011 | Frampton et al. | 416/100 |
| 2003/0228142 A1 | 12/2003 | Reiker | |
| 2005/0092888 A1 | 5/2005 | Gonce | |
| 2007/0183899 A1 * | 8/2007 | Munshi et al. | 416/244 R |
| 2007/0205297 A1 | 9/2007 | Finkam et al. | |
| 2008/0008596 A1 | 1/2008 | Aynsley | |
| 2008/0014090 A1 | 1/2008 | Aynsley et al. | |

OTHER PUBLICATIONS

U.S. Appl. No. 60/975,230, filed Sep. 26, 2007, Scherer et al.
International Search Report dated Nov. 21, 2008 for Application No. PCT/US2008/075561.

* cited by examiner

*Primary Examiner* — S. V Clark
(74) *Attorney, Agent, or Firm* — Frost Brown Todd LLC

(57) ABSTRACT

A fan system comprises a fan, a bracket configured to mount to a ceiling structure, and a mounting assembly coupling the fan with the bracket. The mounting assembly comprises a fan mounting assembly secured to the fan; and a bracket mounting assembly secured to the bracket. The mounting assembly includes an elongate member extending between the fan mounting assembly and the bracket mounting assembly. The fan mounting assembly is configured to permit adjustment of the orientation of the fan axis about two axes that are perpendicular to the fan axis. The bracket mounting assembly is configured to permit adjustment of the orientation of the elongate member axis about two axes that are perpendicular to the elongate member axis. The bracket mounting assembly permits self-adjustment of the mounting assembly, to re-position the center of gravity of the fan system underneath the bracket after the fan axis orientation has been adjusted.

20 Claims, 8 Drawing Sheets

CEILING FAN WITH ANGLED MOUNTING

PRIORITY

This application claims priority from the disclosure of U.S. Provisional Patent Application Ser. No. 60/972,890, entitled "Ceiling Fan with Angled Mounting," filed Sep. 17, 2007, the disclosure of which is incorporated by reference herein in its entirety.

BACKGROUND

In some settings, large diameter, High Volume/Low Speed ceiling fans may provide an effective means of air circulation due to their high volume air flow, energy efficiency, quiet operation, and/or for other reasons. However, some designs of such fans may direct airflow only vertically downward, and distribution of air may be dependent on outward flow, symmetrically outward from the axis of the fan, at the floor level. While this may produce an acceptable and appropriate pattern of air flow in some settings, there might be some situations in which it is desirable to combine the benefits of a High Volume/Low Speed ceiling fan with the ability to orient the axis of flow in a direction other than completely vertical.

In addition, some configurations of High Volume/Low Speed ceiling fans may utilize an AC induction motor driving the fan blades through an axial speed reducing gearbox. While this may be suitable for a conventional vertical-flow ceiling fan application in some settings, this design may distribute a substantial amount of mass over a considerable distance along the fan axis, and may result in the center of gravity of the motor and gearbox assembly being some distance above that of the total fan assembly. In addition, in some situations, the physical height of the motor and gearbox assembly may cause the mounting point of the assembly to be located a considerable distance above the center of gravity of the fan. While this may be beneficial for stability in a conventional vertical-flow mounting arrangement under some circumstances, this might create difficulties in some situations if it is desired to orient the fan in such a way that its flow is not completely vertical. For instance, in some situations, the stresses that would result from orienting a fan of this configuration in a substantially non-vertical position might be considerable and might be undesirable.

While a variety of systems and methods have been made and used to mount fans and other devices, it is believed that no one prior to the inventor has made or used the invention described in the appended claims.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
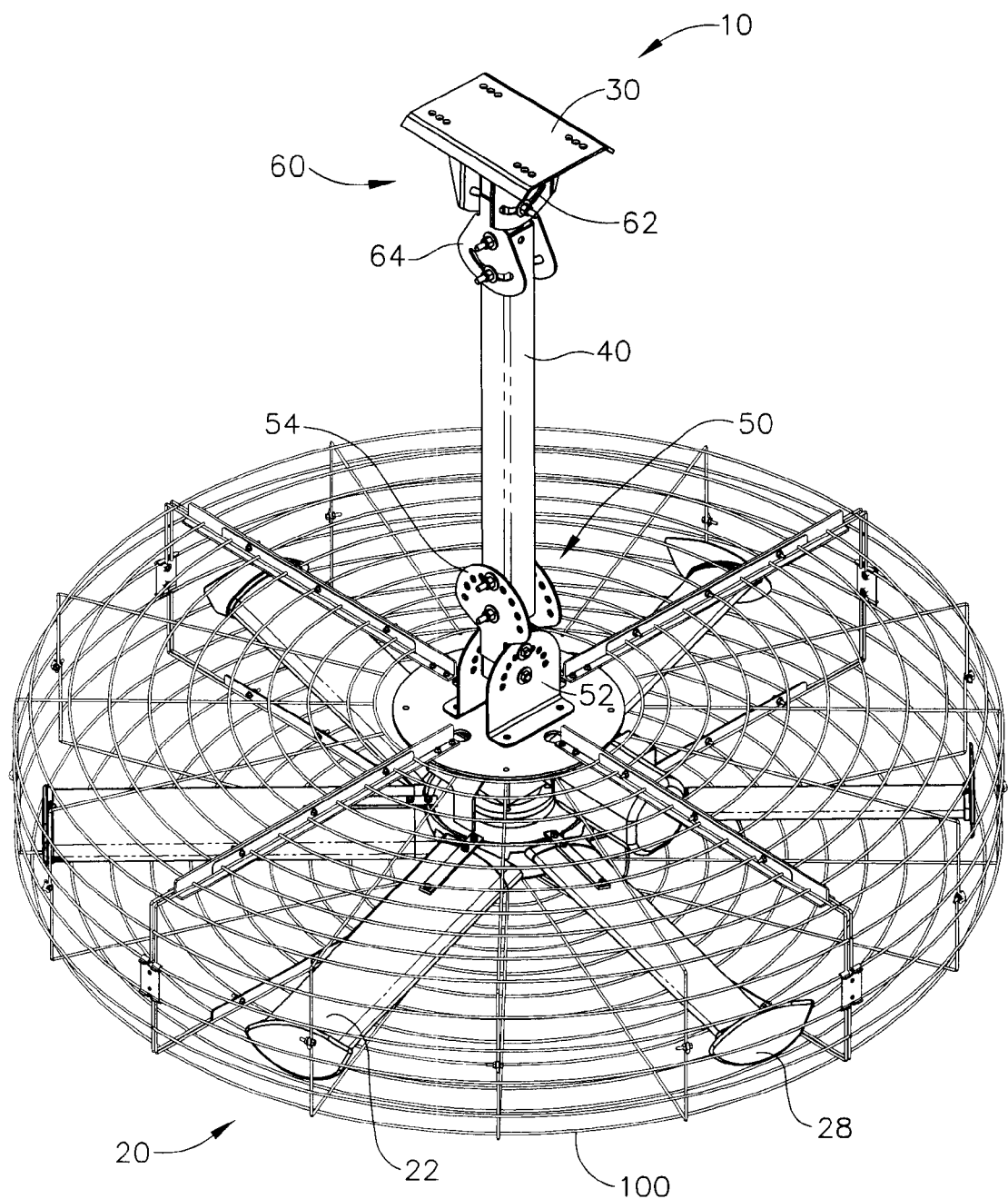
FIG. 1 depicts a perspective view of an exemplary fan system.

Reference will now be made in detail to various embodiments of the invention, examples of which are illustrated in the accompanying drawings. To the extent that specific dimensions are shown in the accompanying drawings, such dimensions should be regarded as merely illustrative and not limiting in any way. Accordingly, it will be appreciated that such dimensions may be varied in any suitable way.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

As shown in FIGS. 1-8, an exemplary fan system (10) includes a fan (20), a bracket (30), an extension tube (40), a lower adjustment assembly (50), and an upper self-adjustment assembly (60). Fan (20) is adjustably coupled with tube (40) via lower adjustment assembly (50). Tube (40) is adjustably coupled with bracket (30) via upper self-adjustment assembly (60). Bracket (30) is configured to permit fan system to be mounted to a ceiling or other structure. As will be described in greater detail below, some versions of fan system (10) are configured to permit fan (20) to be oriented in a variety of non-vertical positions, while keeping the center of gravity of fan system (10) substantially directly below bracket (30).

While examples discussed herein provide a context of fan system (10) being mounted to a ceiling via bracket (30), it should be understood that fan system (10) may be mounted to a variety of other structures at a variety of locations other than on or near a ceiling. Furthermore, it should be understood that, like all other components described herein, bracket (30) is merely optional, and a variety of other structures having any desired configuration may be used for mounting fan system (10) to a ceiling or other structure. It should also be understood that a variety of alternative devices (e.g., one or more lights, other fixtures, etc.) may be coupled with the mounting structures (30, 40, 50, 60) described herein, and that a fan (20) need not necessarily be included in all versions.

Fan (20) of the present example comprises fan blades (22), a hub (24), a motor (26), and a gearbox (25). Each fan blade (22) has a winglet (28) mounted to its free end, and an interface component (29) provided at the interface of each fan blade (22) and hub (24). By way of example only, fan blades (22) may be configured in accordance with any of the teachings in U.S. Pat. No. 7,284,960, entitled "Fan Blades," issued Oct. 23, 2007, the disclosure of which is incorporated by reference herein. Alternatively, fan blades (22) may be configured in accordance with any of the teachings in U.S. Pub. No. 2008/0008596, entitled "Fan Blades," published Jan. 10, 2008, the disclosure of which is incorporated by reference herein. Still other suitable configurations for fan blades (22) will be apparent to those of ordinary skill in the art in view of the teachings herein.

As another merely illustrative example, winglets (28) may be configured in accordance with any of the teachings in U.S. Pat. No. 7,252,478, entitled "Fan Blade Modifications," issued Aug. 7, 2007, the disclosure of which is incorporated by reference herein. Alternatively, winglets (28) may be configured in accordance with any of the teachings in U.S. Pub. No. 2008/0014090, entitled "Cuffed Fan Blade Modifications," published Jan. 17, 2008, the disclosure of which is incorporated by reference herein. Still other suitable configurations for winglets (28) will be apparent to those of ordinary skill in the art in view of the teachings herein. Of course, as with other components described herein, winglets (28) may simply be omitted altogether.

As yet another merely illustrative example, interface components (29) may be configured in accordance with any of the teachings in U.S. Provisional Patent App. Ser. No. 60/975,230, entitled "Aerodynamic Interface Component for Fan Blade," filed Sep. 26, 2007, the disclosure of which is incorporated by reference herein. Still other suitable configurations for interface components (29) will be apparent to those of ordinary skill in the art in view of the teachings herein. Of course, as with other components described herein, interface components (29) may simply be omitted altogether.

In the present example, motor (26) extends transversely relative to the axis of fan (20). In other words, a conventional coaxial reduction gearbox may be substituted with a gearbox (25) in which the axis of the motor (26) and input shaft (not shown) is perpendicular to the axis of the output shaft (not shown). This may permit the mass of motor (26) to lie flat, parallel, and in close proximity to the plane of fan blades (22), thereby minimizing the shift in the center of gravity as the axis of the fan (20) is rotated from vertical to an oblique angled position. It should be understood, however, that other embodiments may include other gearboxes, including but not limited to conventional gearboxes. Still other embodiments may include no gearbox at all.

As shown in FIG. 1 only, fan (20) may include a surrounding cage (100). Cage (100) is fixedly secured to fan (20) in the present example, and would be adjusted unitarily with fan (20) if fan (20) position and/or orientation is adjusted. Cage (100) may be formed of a substantially rigid wire construction, and may be configured to protect fan from projectiles. Of course, cage (100) is merely optional. Cage (100) is not shown in FIGS. 2-8 for clarity.

Extension tube (40) of the present example comprises an elongate, hollow metal extrusion having a substantially square cross-section. For instance, tube (40) may be formed of steel, aluminum, or any other suitable material, including combinations of materials. The hollow configuration of tube (40) in the present example permits one or more wires, cables, or the like to be passed through the interior of tube (40). While tube (40) of the present example is hollow, it should be understood that tube (40) need not necessarily be hollow in all versions. It should also be understood that tube (40) may have any desired cross-section. Accordingly, while the term "tube" is used, the same should not be construed as necessarily requiring a circular cross-section. Still other suitable configurations for tube (40) will be apparent to those of ordinary skill in the art in view of the teachings herein.

As noted above, lower adjustment assembly (50) is located between fan (20) and extension tube (40). Adjustment assembly (50) is configured to permit selective orientation of fan (20) at various discrete angled positions in two axes. In the present example, these two axes are perpendicular to each other and are each also perpendicular to the axis of fan (20). Of course, other types of position and/or orientation adjustments of fan (20) may be provided by adjustment assembly (50).

Adjustment assembly (50) of the present example comprises two pairs of parallel plates (52, 54). Each plate (52, 54) is provided with a plurality of openings (56) for securely establishing a number of possible angular orientations, as will be described in greater detail below. Openings (56) are shown as being arranged along arcs, though any other suitable arrangement(s) of openings (56) may be used.

Lower plates (52) are attached to the upper surface of fan (20). In the present example, lower plates (52) are discrete components that are separately attached to upper surface of fan (20). By way of example only, lower plates (52) may be secured to the upper surface of fan (20) using any suitable fasteners, welding, or other components or techniques. In other versions, lower plates (52) are integral with one another. For instance, lower plates (52) may be part of a component that has a generally U-shaped cross-section, with a web or other feature joining the bottoms of lower plates (52) to one another. Other suitable variations of lower plates (52) will be apparent to those of ordinary skill in the art in view of the teachings herein.

Upper plates (54) are joined together by an intermediate component (51), such that upper plates (54) and intermediate component (51) together provide a generally U-shaped cross-section. Upper plates (54) may be secured to intermediate component (51) using any suitable fasteners, welding, or other components or techniques. A fastener (70) passes through upper plates (54) and tube (40), providing a pivot connection between upper plates (54) and tube (40). Another fastener (72) also passes through upper plates (54) and tube (40), and may be used to secure the position of upper plates (54) relative to tube (40). In other words, while fastener (70) may provide a pivot point for adjusting the position of upper plates (54) relative to tube (40), fastener (72) may "lock" the position of upper plates (54) relative to tube (40) when the desired position has been obtained. By way of example only, fasteners (70, 72) may comprise bolts, pins, or any other suitable structures or devices. In addition, fastener (70) may have a structure or configuration that is different from the structure or configuration of fastener (72). Furthermore, any other suitable devices or components other than fasteners (70, 72) may be used.

Figure 2:
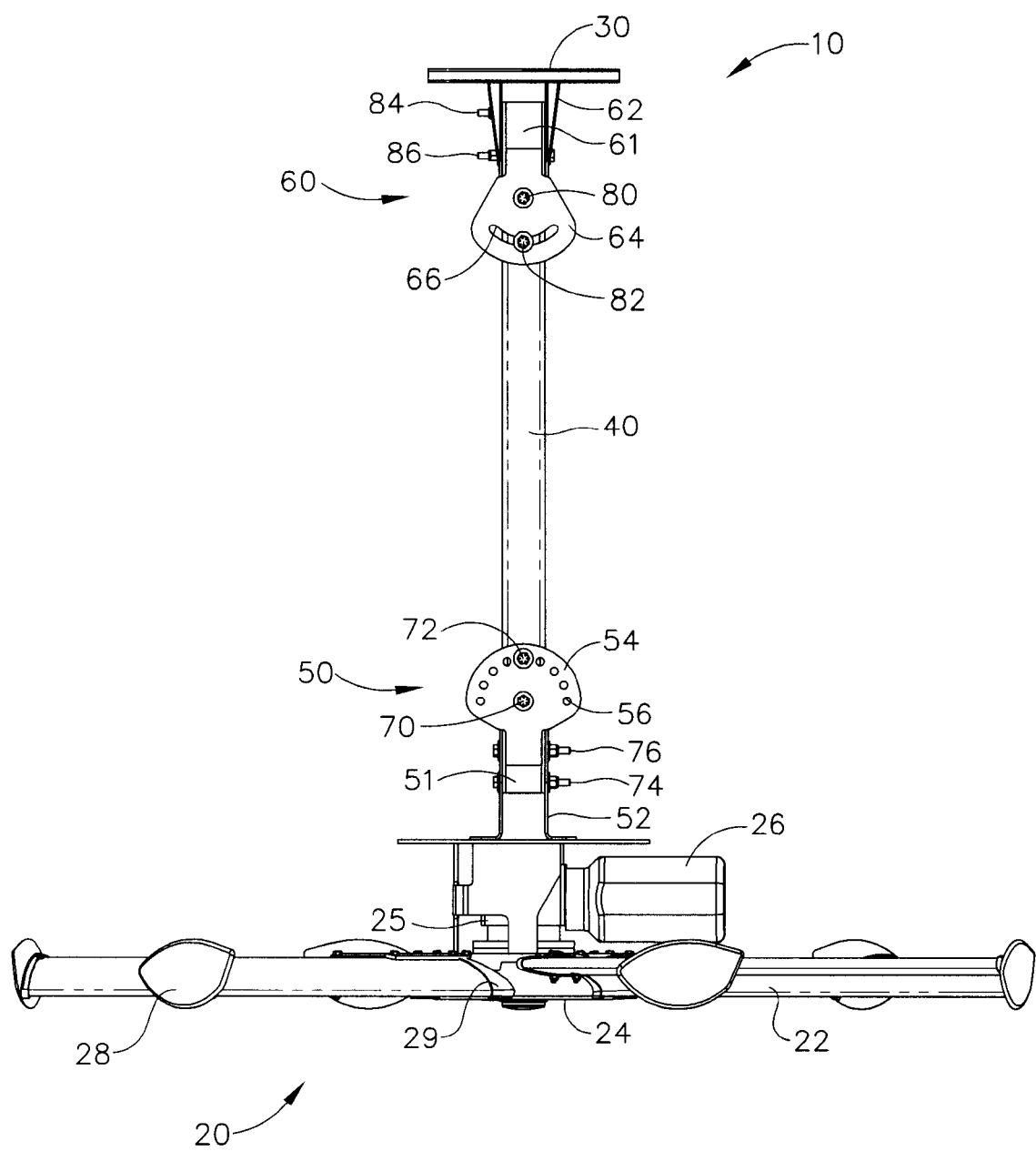
FIG. 2 depicts a front elevational view of the fan system of FIG. 1.
Figure 3:
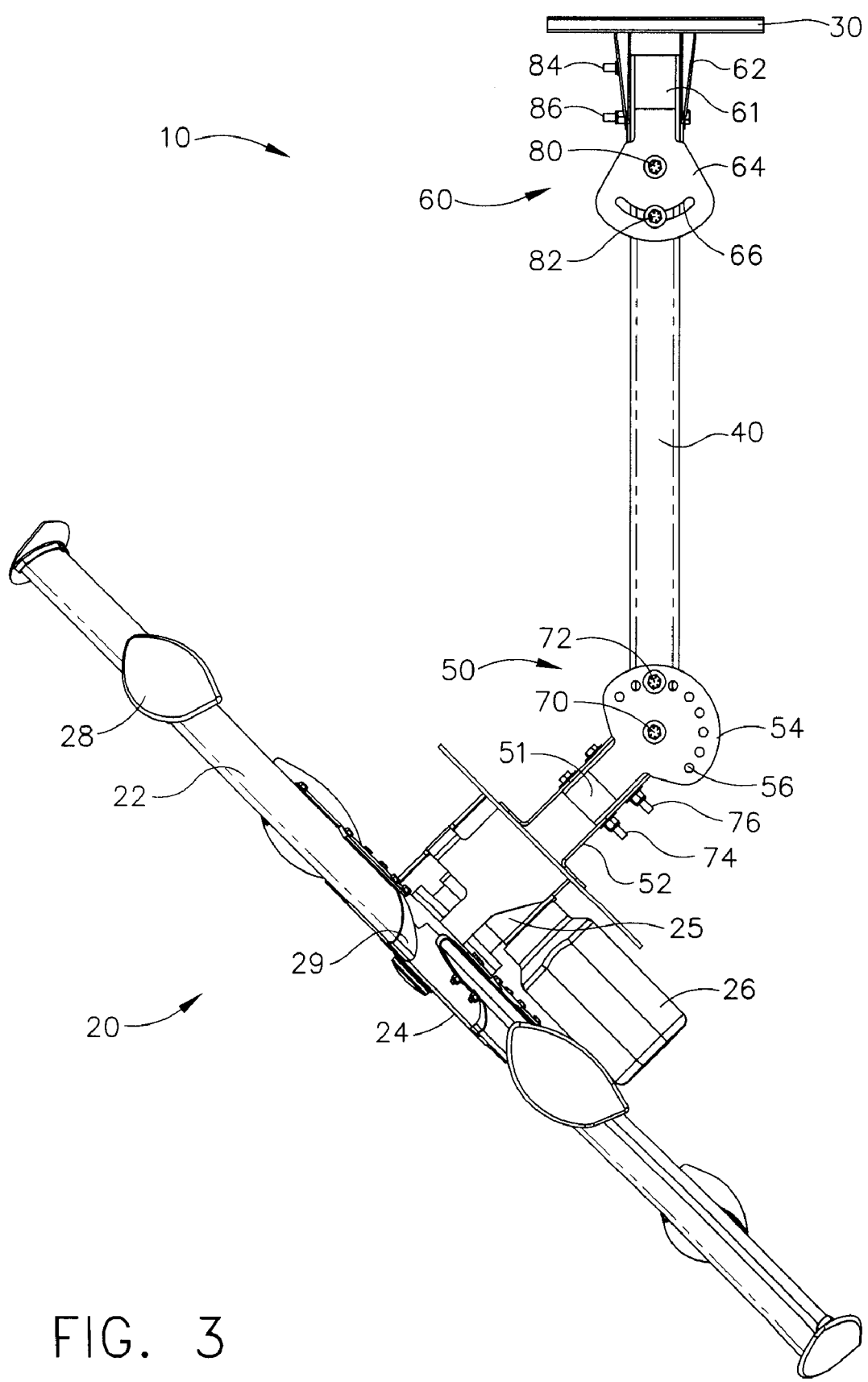
FIG. 3 depicts a front elevational view of the fan system of FIG. 1, with the fan assembly tilted at an angle.
Figure 4:
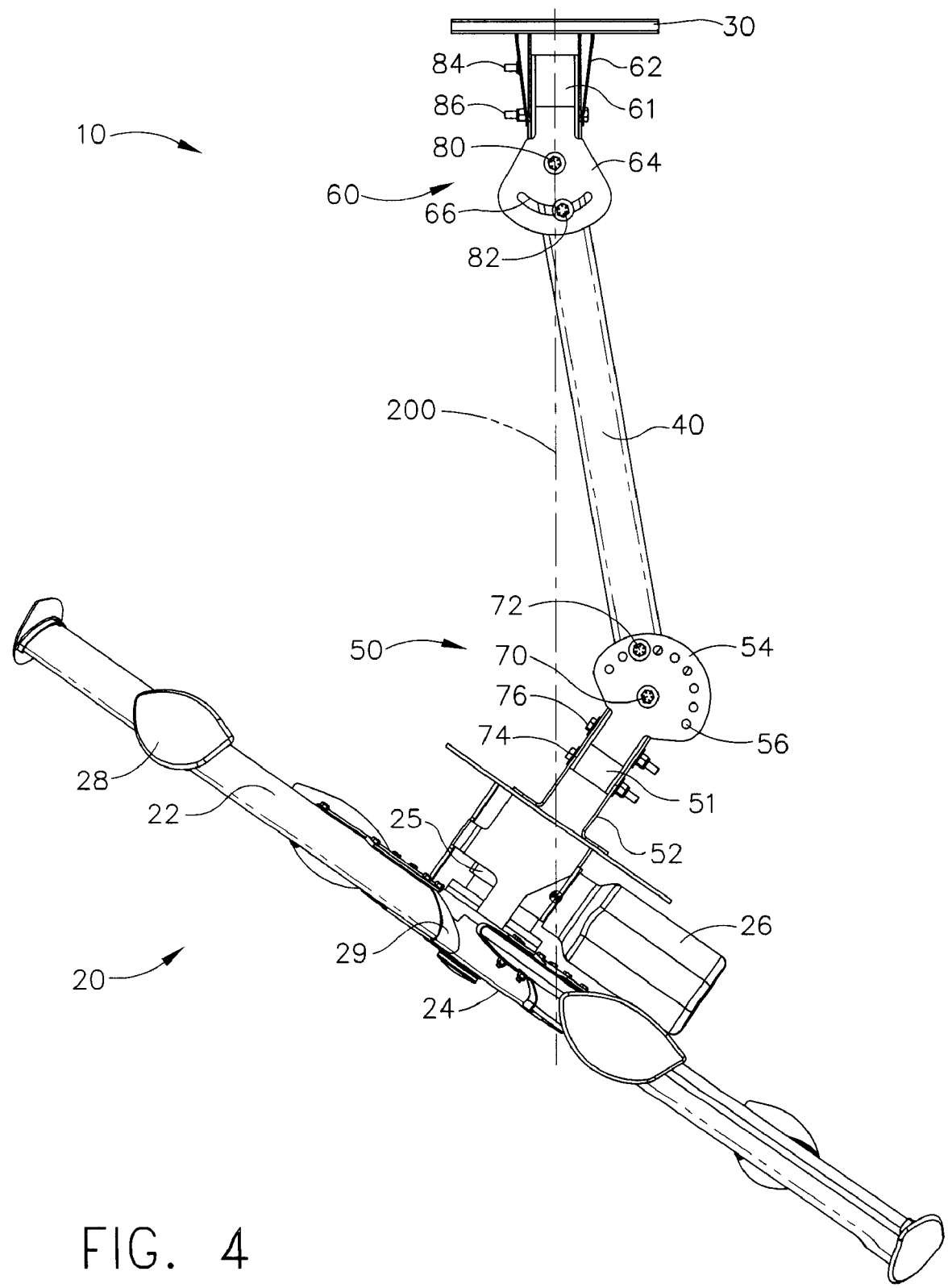
FIG. 4 depicts the fan system of FIG. 1, with the fan assembly tilted at the angle of FIG. 3, and with the support structure adjusted.

FIGS. 2-4 illustrate an example of how upper plates (54) may be used to adjust the angular orientation of fan (20). In particular, FIGS. 2-4 show how the angular orientation of fan (20) may be adjusted about the axis defined by fastener (70). FIG. 2 shows fan (20) with its axis in a vertical orientation. As shown in FIG. 2, fastener (72) is positioned within an opening (56) that is at the top center of the arc defined by openings (56). As shown in FIGS. 3-4, fastener (72) has been removed, and fan (20) has been pivoted about the axis or pivot point defined by fastener (70) to orient the axis of fan (20) at a non-vertical orientation. Fastener (72) has then been re-inserted into another pair of openings (56) in upper plates (54) to "lock" this new orientation.

Another set of fasteners (74, 76) are inserted through intermediate component (51) and lower plates (52). In particular, fastener (74) provides a pivot connection between lower plates (52) and intermediate component (51). Fastener (76) may be used to secure the position of lower plates (52) relative to intermediate component (51). In other words, while fastener (74) may provide a pivot point for adjusting the position of lower plates (52) relative to intermediate component (51), fastener (76) may "lock" the position of lower plates (52) relative to intermediate component (51) when the desired position has been obtained. As with fasteners (70, 72), fasteners (74, 76) may comprise bolts, pins, or any other suitable structures or devices. In addition, fastener (74) may have a structure or configuration that is different from the structure or configuration of fastener (76). Furthermore, any other suitable devices or components other than fasteners (74, 76) may be used.

Figure 5:
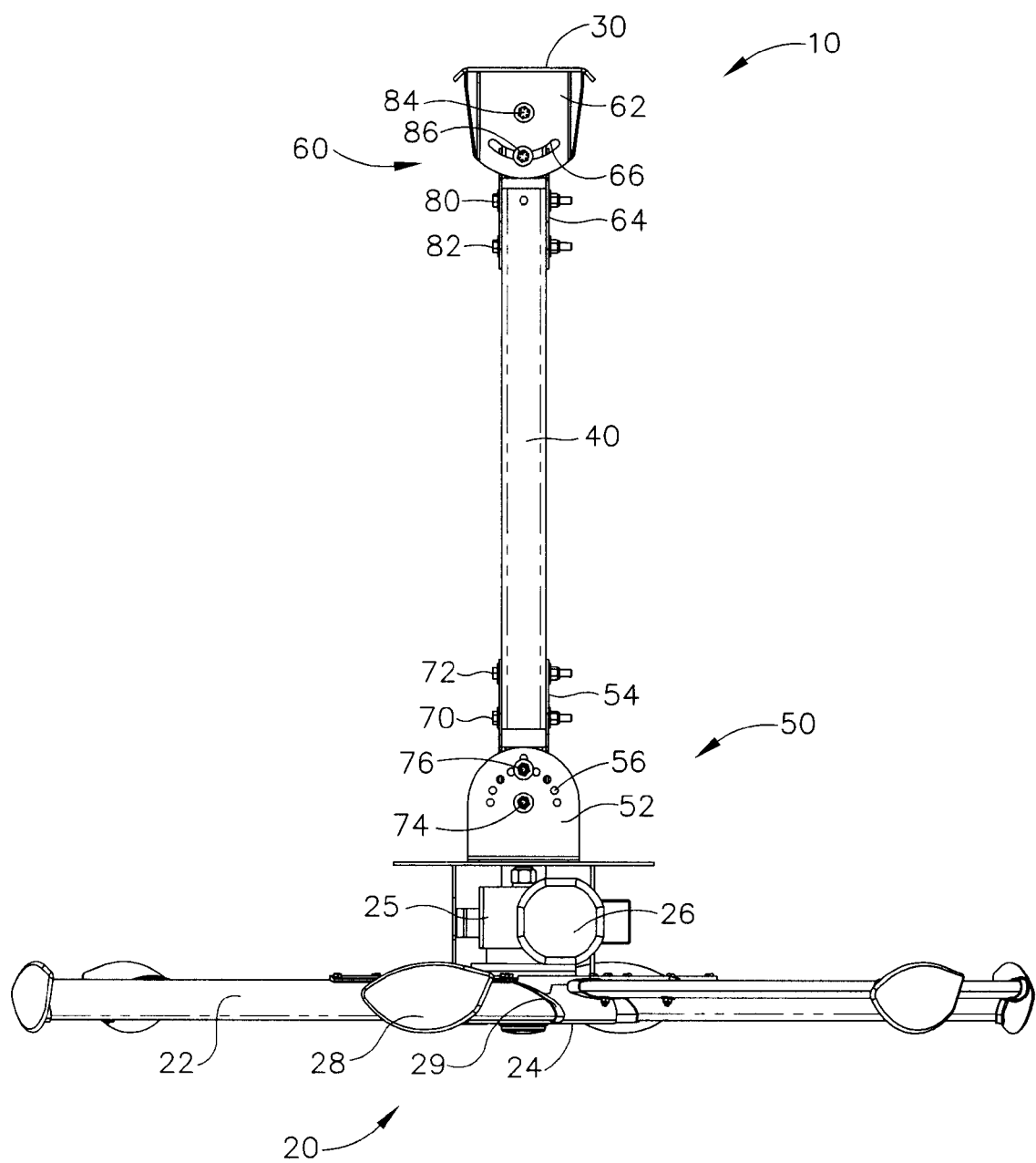
FIG. 5 depicts a side elevational view of the fan system of FIG. 1.
Figure 6:
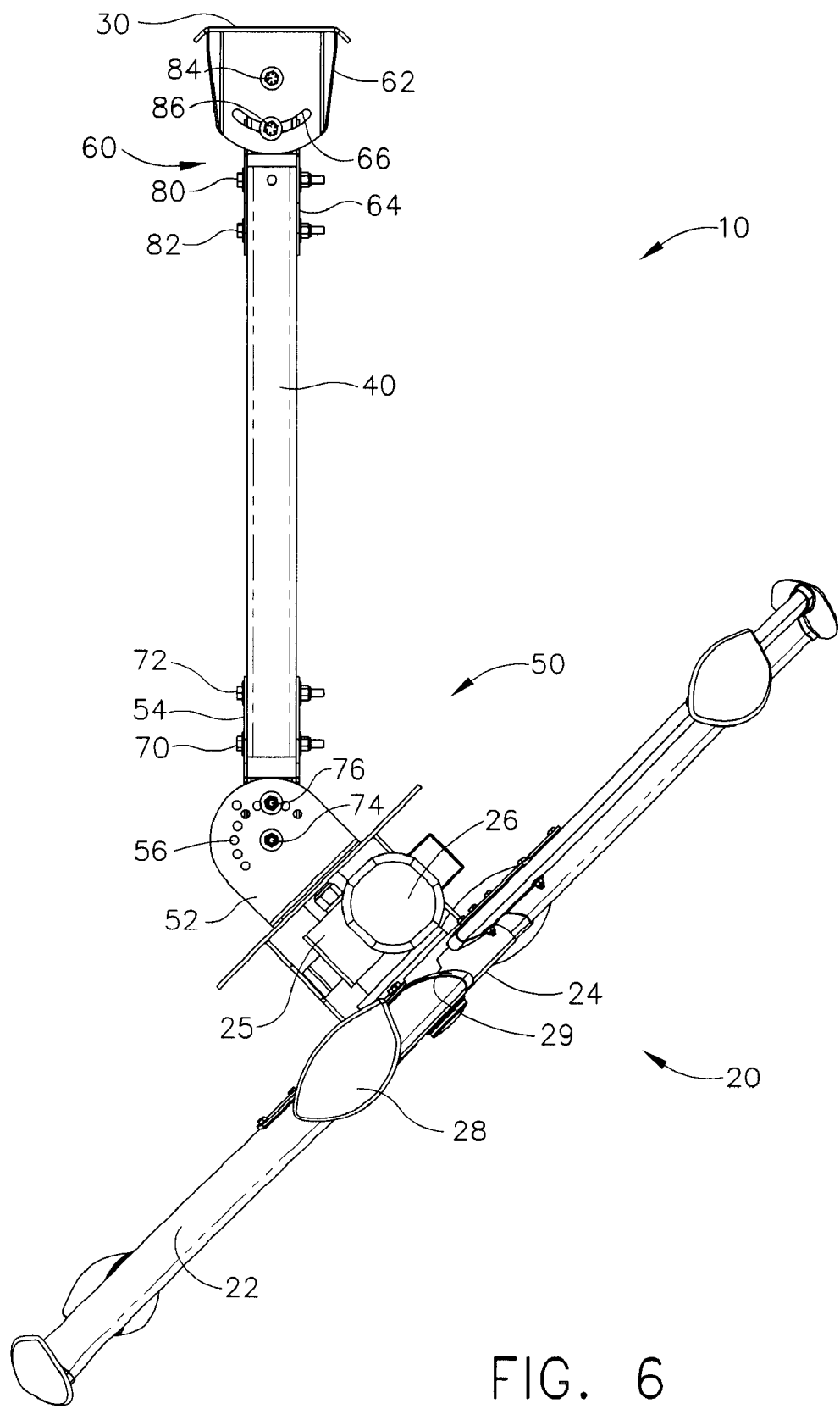
FIG. 6 depicts a side elevational view of the fan system of FIG. 1, with the fan assembly tilted at an angle.
Figure 7:
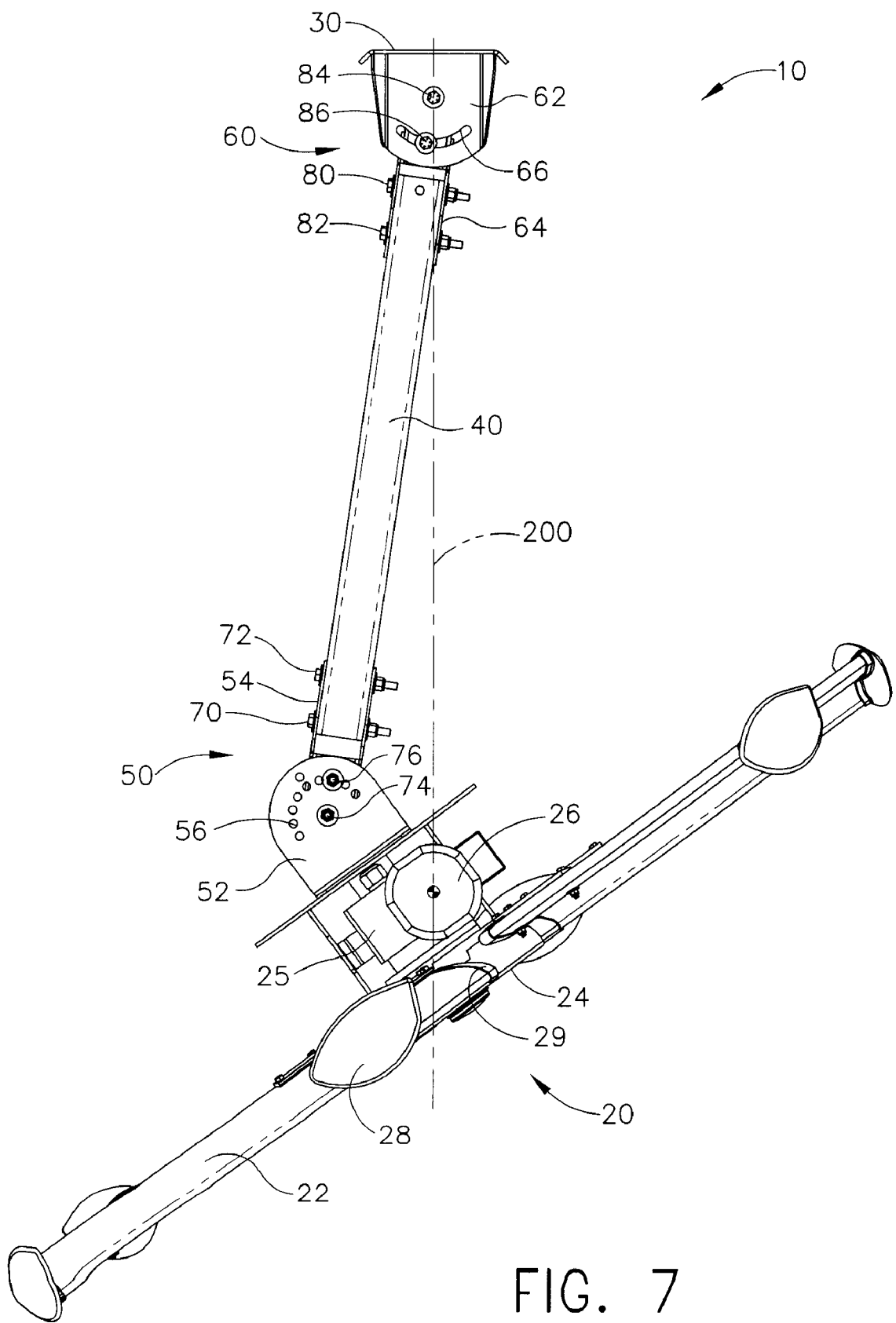
FIG. 7 depicts a side elevational view of the fan system of FIG. 1, with the fan assembly tilted at the angle of FIG. 6, and with the support structure adjusted.

FIGS. 5-7 illustrate an example of how lower plates (52) may be used to adjust the angular orientation of fan (20). In particular, FIGS. 5-7 show how the angular orientation of fan (20) may be adjusted about the axis defined by fastener (74). FIG. 5 shows fan (20) with its axis in a vertical orientation. As shown in FIG. 5, fastener (76) is positioned within an opening (56) that is at the top center of the arc defined by openings (56). As shown in FIGS. 6-7, fastener (76) has been removed, and fan (20) has been pivoted about the axis or pivot point defined by fastener (74) to orient the axis of fan (20) at a non-vertical orientation. Fastener (76) has then been re-inserted into another pair of openings (56) in lower plates (52) to "lock" this new orientation.

Figure 8:
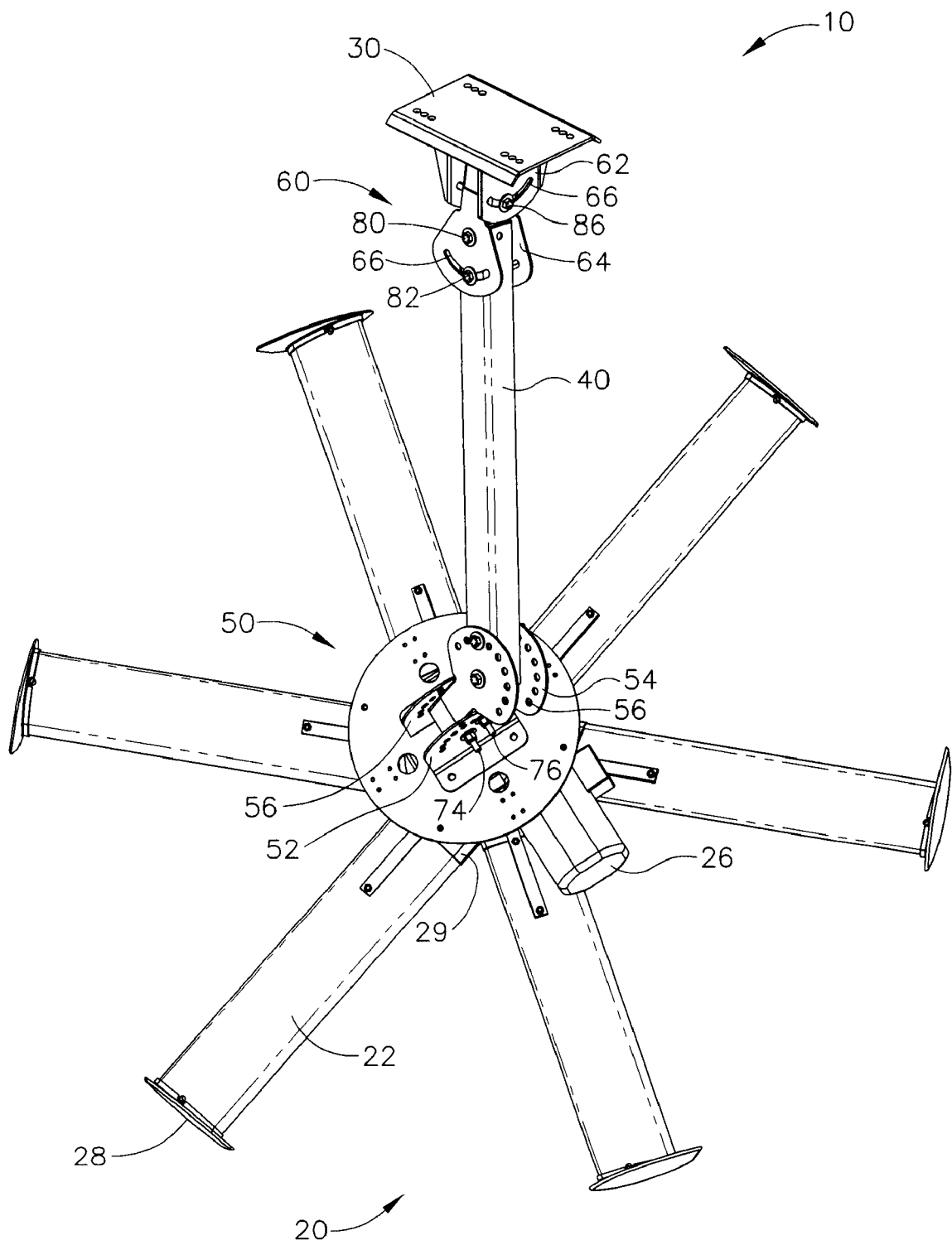
FIG. 8 depicts a perspective view of the fan system of FIG. 1, with the fan assembly tilted at the angles of FIGS. 3 and 6.

It should be understood that both sets or pairs of plates (52, 54) may be used to adjust the orientation of fan (20). A merely illustrative example of such adjustment is shown in FIG. 8, in which the orientation of fan (20) has been adjusted about the axis or pivot point defined by fastener (70), as well as being adjusted about the axis or pivot point defined by fastener (74). Fasteners (72, 76) serve to "lock" each of these adjustments, respectively.

In the present example, the two sets or pairs of plates (52, 54) are installed such that the two sets or pairs of plates (52, 54) remain mutually perpendicular to one another throughout their range of adjustment. However, any other suitable configuration may be used. Other suitable components, features, and configurations for adjustment assembly (50) will be apparent to those of ordinary skill in the art in view of the teachings herein.

In some versions, fan system (10) may be configured such that the center of gravity of fan system (10) stays substantially vertically below the center of bracket (30) when the orientation of fan (20) is adjusted using either or both sets of plates (52, 54). Nevertheless, in some versions, there may still be some appreciable displacement of the center of gravity of fan system (10) as fan (20) is changed from one angular position to another among the available settings provided by plates (52, 54). In some but not all versions, it may be undesirable for the center of gravity of fan system (10) to be significantly displaced from a vertical line (200) below the center of bracket (30), as this might impose residual stresses into the building structure in some situations and/or jeopardize the attachment of bracket (30) to the ceiling or other structure. For this reason or other reasons, an optional self-adjustment assembly (60) may be located between the top of tube (40) and bracket (30). In particular, and as will be described in greater detail below, self-adjustment assembly (60) may permit correction of the entire fan system (10) to find proper balance so that the center of gravity of fan system (10) is located approximately directly below the center of ceiling attachment bracket (30).

As noted above, self-adjustment assembly (60) is configured to provide balancing of fan system (10), such as after the orientation of fan (20) has been changed using lower adjustment assembly (50) or otherwise. In particular, self-adjustment assembly (60) provides repositioning of extension tube (40) relative to bracket (30) about two axes. In the present example, these two axes are perpendicular to each other and are each also perpendicular to the longitudinal axis defined by extension tube (40). Of course, other types of balancing, orientation, and/or positioning adjustments of fan system (10) may be provided by self-adjustment assembly (60).

Self-adjustment assembly (60) comprises two sets or pairs of parallel plates (62, 64). Each plate (62, 64) has an arc-shaped slot (66) formed therein. Thus, in some versions, plates (62, 64) are not provided with a plurality of openings permitting selection of a number of discrete adjustment positions. Instead, arc-shaped slots (66) permit continuous adjustment over a range of positions. By orienting the two sets of plates (62, 64) in mutually perpendicular planes, free and continuous rotational movement may be permitted in all directions throughout the range provided. Of course, one or more of the sets of plates (62, 64) may include a plurality of openings (e.g., similar to openings (56) in plates (52, 54), etc.) to permit discrete adjustment positions, in addition to or as an alternative to having arc-shaped slots (66). Similarly, one or more of the sets of plates (52, 54) may include arc-shaped slots in addition to or as an alternative to having a plurality of discrete openings (56). Still other suitable configurations will be apparent to those of ordinary skill in the art.

Upper plates (62) are attached to bracket (30). In the present example, upper plates (62) are discrete components that are separately attached to bracket (30) via welding. By way of example only, upper plates (62) may be secured to bracket (30) using any suitable fasteners, welding, or other components or techniques. In other versions, upper plates (62) are integral with one another. For instance, upper plates (62) may be part of a component that has a generally U-shaped cross-section, with a web or other feature joining the tops of upper plates (62) to one another. Other suitable variations of upper plates (62) will be apparent to those of ordinary skill in the art in view of the teachings herein.

Lower plates (64) are joined together by an intermediate component (61), such that lower plates (64) and intermediate component (61) together provide a generally U-shaped cross-section. Lower plates (64) may be secured to intermediate component (61) using any suitable fasteners, welding, or other components or techniques. A fastener (80) passes through lower plates (64) and tube (40), providing a pivot connection between lower plates (64) and tube (40). Another fastener (82) also passes through lower plates (64) and tube (40), and may be used to secure the position of lower plates (64) relative to tube (40). In other words, while fastener (80) may provide a pivot point for adjusting the position of lower plates (64) relative to tube (40), fastener (82) may "lock" the position of lower plates (64) relative to tube (40) when the desired position has been obtained. By way of example only, fasteners (80, 82) may comprise bolts, pins, or any other suitable structures or devices. In addition, fastener (80) may have a structure or configuration that is different from the structure or configuration of fastener (82). Furthermore, any other suitable devices or components other than fasteners (80, 82) may be used.

FIGS. 2-4 illustrate an example of how lower plates (64) may be used to adjust the angular orientation of tube (40), such as to compensate for adjustments that have been made to orientation of fan (20) using adjustment assembly (50). In particular, FIGS. 2-4 show how the angular orientation of tube (40) may be adjusted about the axis defined by fastener (80). FIG. 2 shows tube (40) and fan (20) with their axes each aligned in a vertical orientation. As described above, FIGS. 2-3 show a series whereby fastener (72) has been removed from one pair of openings (56) in plates (54), the orientation of fan (20) has been adjusted about the pivot or axis provided by fastener (70), and then fastener (72) is inserted into another pair of openings (56) in plates (54) to "lock" the adjustment of the orientation of fan (20). In this example, and with reference to FIG. 3 in particular, this adjustment of the orientation of fan (20) has shifted the center of gravity of fan system (10) to the left, such that the center of gravity is no longer approximately directly underneath the center of bracket (30).

FIGS. 3-4 show a series whereby self-adjustment assembly (60) is used to reposition the center of gravity of fan system (10) to a location that is substantially directly underneath the center of bracket (30), to compensate for adjustments that have been made to orientation of fan (20) using adjustment assembly (50) as illustrated in the series of FIGS. 2-3. In particular, with the configuration shown in FIG. 3, fastener (82) may be loosened, if not removed altogether. With fastener (82) so loosened or removed, tube (40) may be permitted to pivot freely about the pivot or axis provided by fastener (80). With such free pivoting being permitted, fan system (10) may naturally align itself to the position shown in FIG. 4. In particular, in the position shown in FIG. 4, the center of gravity of fan system (10) may be located substantially directly underneath the center of bracket (30), as indicated by line (200). Fan system (10) may thus be substantially balanced in this configuration, minimizing stresses upon bracket (30) and or stresses on a ceiling as induced through bracket (30). Fastener (82) may be reinserted through slot (66) and tightened to "lock" this balanced configuration. In some situation, friction or other considerations may warrant a user pushing tube (40) slightly when fastener (82) has been loosened or removed, in order to assist fan system (10) to re-center itself to achieve the balance described above.

Another set of fasteners (84, 86) are inserted through intermediate component (61) and upper plates (62). In particular, fastener (84) provides a pivot connection between upper plates (62) and intermediate component (61). Fastener (86) may be used to secure the position of intermediate component (61) relative to upper plates (62). In other words, while fastener (84) may provide a pivot point for adjusting the position of intermediate component (61) relative to upper plates (62), fastener (86) may "lock" the position of intermediate component (61) relative to upper plates (62) when the desired position has been obtained. As with fasteners (80, 82), fasteners (84, 86) may comprise bolts, pins, or any other suitable structures or devices. In addition, fastener (84) may have a structure or configuration that is different from the structure or configuration of fastener (86). Furthermore, any other suitable devices or components other than fasteners (84, 86) may be used.

FIGS. 5-7 illustrate an example of how upper plates (62) may be used to adjust the angular orientation of tube (40), such as to compensate for adjustments that have been made to orientation of fan (20) using adjustment assembly (50). In particular, FIGS. 5-7 show how the angular orientation of tube (40) may be adjusted about the axis defined by fastener (84). FIG. 5 shows tube (40) and fan (20) with their axes each aligned in a vertical orientation. As described above, FIGS. 5-6 show a series whereby fastener (76) has been removed from one pair of openings (56) in plates (52), the orientation of fan (20) has been adjusted about the pivot or axis provided by fastener (74), and then fastener (76) is inserted into another pair of openings (56) in plates (52) to "lock" the adjustment of the orientation of fan (20). In this example, and with reference to FIG. 3 in particular, this adjustment of the orientation of fan (20) has shifted the center of gravity of fan system (10) to the left, such that the center of gravity is no longer approximately directly underneath the center of bracket (30).

FIGS. 6-7 show a series whereby self-adjustment assembly (60) is used to reposition the center of gravity of fan system (10) to a location that is substantially directly underneath the center of bracket (30), to compensate for adjustments that have been made to orientation of fan (20) using adjustment assembly (50) as illustrated in the series of FIGS. 5-6. In particular, with the configuration shown in FIG. 6, fastener (86) may be loosened, if not removed altogether. With fastener (86) so loosened or removed, tube (40) may be permitted to pivot freely about the pivot or axis provided by fastener (84). With such free pivoting being permitted, fan system (10) may naturally align itself to the position shown in FIG. 7. In particular, in the position shown in FIG. 7, the center of gravity of fan system (10) may be located substantially directly underneath the center of bracket (30), as indicated by line (200). Fan system (10) may thus be substantially balanced in this configuration, minimizing stresses upon bracket (30) and or stresses on a ceiling as induced through bracket (30). Fastener (86) may be reinserted through slot (66) and tightened to "lock" this balanced configuration. In some situation, friction or other considerations may warrant a user pushing tube (40) slightly when fastener (86) has been loosened or removed, in order to assist fan system (10) to re-center itself to achieve the balance described above.

It should be understood that both sets or pairs of plates (62, 64) may be used to adjust the orientation of tube (40) and/or otherwise compensate for adjustments of fan (20) orientation. A merely illustrative example of such adjustment is shown in FIG. 8, in which the orientation of tube (40) has been adjusted about the axis or pivot point defined by fastener (80), as well as being adjusted about the axis or pivot point defined by fastener (84). Fasteners (82, 86) serve to "lock" each of these adjustments, respectively.

In the present example, the two sets or pairs of plates (62, 64) are installed such that the two sets or pairs of plates (62, 64) remain mutually perpendicular to one another throughout their range of adjustment. However, any other suitable configuration may be used. Other suitable components, features, and configurations for adjustment assembly (60) will be apparent to those of ordinary skill in the art in view of the teachings herein.

While self-adjustment assembly (60) is described herein as being used to compensate for adjustments made using adjustment assembly (50), it should be understood that self-adjustment assembly (60) may be used otherwise. For instance, adjustments may be made to tube (40) orientation using self-adjustment assembly (60) even if no adjustments have been made to fan (20) orientation using adjustment assembly (50). Similarly, adjustments may be made to fan (20) orientation using adjustment assembly (50) without necessarily making adjustments using self-adjustment assembly (60). Adjustment assembly (50) and self-adjustment assembly (60) may thus be used in conjunction with one another, in cooperation with one another, or independent of one another. Furthermore, in some versions, one of adjustment assembly (50) or self-adjustment assembly (60) is included in fan system (10) while the other of adjustment assembly (50) or self-adjustment assembly (60) is excluded from fan system (10).

In some embodiments, the diameter of fan (20) is between approximately 4 feet, inclusive, and approximately 8 feet, inclusive. For instance, the diameter of the fan (20) may be approximately 8 feet. Of course, any other suitable diameter may be used.

In some embodiments, the maximum range of adjustment of fan (20) is between approximately 30 degrees, inclusive, from the vertical axis, and approximately 90 degrees, inclusive, from the vertical axis. Of course, any other suitable range of adjustment may be provided. Furthermore, different plates (52, 54, 62, 64) may provide different angular ranges.

It will be appreciated that the orientation of fan (20) may be angularly adjusted within the range of adjustment in a progressive manner (e.g., using a slot feature instead of discrete openings (56) in either or both pairs of plates (52, 54), etc.). It will also be appreciated that the orientation of the fan (20) may be adjusted within the range of adjustment in discrete increments. In other words, discrete openings (56) in plates (52, 54) may be spaced at any suitable increments. For instance, in some embodiments (e.g., where openings (56) are positioned along an arc), the increment of adjustment of fan (20) is between approximately 10 degrees, inclusive, and approximately 30 degrees, inclusive. Of course, the orientation of fan (20) may be adjusted in any other suitable angular increments. Furthermore, to the extent that the adjustability of the fan orientation is provided in increments, such increments need not be consistent throughout the range of adjustment (e.g., increments may get greater or smaller as the orientation approaches the outer constraints and/or center of the adjustment range, etc.). In addition, different plates (52, 54, 62, 64) may provide different increments.

In some embodiments, the maximum rotational speed of the fan (20) is between approximately 125 RPM, inclusive, and approximately 250 RPM, inclusive. Of course, any other suitable rotational speed may be used.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A fan system, the fan system comprising:
   (a) a fan, wherein the fan is configured to rotate about a fan axis;
   (b) a bracket configured to mount to a ceiling structure; and
   (c) a mounting assembly coupling the fan with the bracket, wherein the mounting assembly comprises:
      (i) a fan mounting assembly, wherein the fan mounting assembly is secured to the fan,
      (ii) a bracket mounting assembly, wherein the bracket mounting assembly is secured to the bracket, and
      (iii) an elongate member extending between and secured to the fan mounting assembly and the bracket mounting assembly, wherein the elongate member defines a longitudinal axis,
   wherein the fan mounting assembly is configured to permit adjustment of the orientation of the fan axis,
   wherein the bracket mounting assembly is configured to permit adjustment of the orientation of the longitudinal axis defined by the elongate member;
   wherein the fan mounting assembly is configured to permit adjustment of the orientation of the fan axis about a first adjustment axis and about a second adjustment axis,
   wherein the first adjustment axis and the second adjustment axis are each substantially perpendicular to the fan axis.

2. The fan system of claim 1, wherein the elongate member comprises a tube.

3. The fan system of claim 2, wherein the tube has a non-circular cross-section.

4. The fan system of claim 1, wherein the fan mounting assembly comprises a first pair of plates.

5. The fan system of claim 4, wherein the plates of the first pair of plates are generally parallel to each other.

6. The fan system of claim 4, wherein each plate of the first pair of plates includes a plurality of openings formed therethrough.

7. The fan system of claim 6, wherein at least some of the openings of the plurality of openings are positioned along an arc.

8. The fan system of claim 6, wherein the fan mounting assembly further comprises a hinge member configured to provide a pivot point, wherein the fan mounting assembly is configured to permit the fan to pivot about the pivot point.

9. The fan system of claim 8, wherein the hinge member comprises a fastener.

10. The fan system of claim 9, wherein the fastener comprises a bolt.

11. The fan system of claim 8, wherein the fan mounting assembly further comprises a locking member configured to cooperate with a selected at least one opening of the plurality of openings.

12. The fan system of claim 11, wherein the locking member comprises a fastener.

13. The fan system of claim 4, wherein the fan mounting assembly further comprises a second pair of plates.

14. The fan system of claim 13, wherein the first pair of plates are secured to the fan, wherein the second pair of plates are secured to the first pair of plates and the elongate member.

15. The fan system of claim 1, wherein the fan mounting assembly comprises a plurality of discrete openings configured to selectively receive a locking member to selectively lock an orientation of the fan axis at an adjustment position selected from a set of discrete adjustment positions, wherein the bracket mounting assembly comprises a slot configured to selectively receive a locking member to selectively lock an orientation of the longitudinal axis defined by the elongate member at an adjustment position selected from a continuous range of adjustment positions.

16. A method of adjusting the orientation of a fan, the method comprising:
   (a) providing a fan;
   (b) providing a mounting assembly, wherein the fan is coupled with the mounting assembly, wherein the mounting assembly is further coupled with a fixed structure via a bracket that has a center, wherein the mounting assembly comprises:
      (i) a fan mounting assembly, wherein the fan mounting assembly comprises a pivot member and a locking member,
      (ii) a bracket mounting assembly, wherein the bracket mounting assembly comprises a pivot member and a locking member, and
      (iii) an elongate member extending between the fan mounting assembly and the bracket mounting assembly, wherein the elongate member defines a longitudinal axis;
   (c) adjusting the orientation of the fan about the pivot member of the fan mounting assembly;
   (d) securing the locking member of the fan mounting assembly relative to the fan mounting assembly to substantially secure the adjusted orientation of the fan about the pivot member of the fan mounting assembly;
   (e) permitting the elongate member to pivot freely about the pivot member of the bracket mounting assembly to locate the center of gravity of the fan and mounting assembly substantially directly below the center of the bracket through self-adjustment of the elongate member orientation; and (f) securing the locking member of the bracket mounting assembly relative to the bracket mounting assembly to substantially secure the adjusted orientation of the elongate member about the pivot member of the bracket mounting assembly.

17. A fan system, the fan system comprising:
(a) a fan, wherein the fan is configured to rotate about a fan axis;
(b) a bracket configured to mount to a ceiling structure; and
(c) a mounting assembly coupling the fan with the bracket, wherein the mounting assembly comprises:
   (i) a fan mounting assembly, wherein the fan mounting assembly is secured to the fan,
   (ii) a bracket mounting assembly, wherein the bracket mounting assembly is secured to the bracket, and
   (iii) an elongate member extending between and secured to the fan mounting assembly and the bracket mounting assembly, wherein the elongate member defines a longitudinal axis,
   wherein the fan mounting assembly is configured to permit adjustment of the orientation of the fan axis,
   wherein the bracket mounting assembly is configured to permit adjustment of the orientation of the longitudinal axis defined by the elongate member,
   wherein the fan mounting assembly comprises a first pair of plates and a second pair of plates.

18. The fan system of claim 17, wherein the first pair of plates are secured to the fan, wherein the second pair of plates are secured to the first pair of plates and the elongate member.

19. The fan system of claim 17, wherein each plate of the first pair of plates includes a plurality of openings formed therethrough, wherein the fan mounting assembly further comprises a hinge member configured to provide a pivot point, wherein the fan mounting assembly is configured to permit the fan to pivot about the pivot point, wherein the fan mounting assembly further comprises a locking member configured to cooperate with a selected at least one opening of the plurality of openings.

20. The fan system of claim 17, wherein the locking member comprises a fastener.

* * * * *